(12) United States Patent
Asjadi (10) Patent No.: US 8,472,574 B2
(45) Date of Patent: Jun. 25, 2013

(54) RECEIVER AND METHOD OF RECEIVING

(75) Inventor: Gholam Hosein Asjadi, Guildford (GB)

(73) Assignee: Sony Corporation, Tokyo (JP)

( * ) Notice: Subject to any disclaimer, the term of this patent is extended or adjusted under 35 U.S.C. 154(b) by 694 days.

(21) Appl. No.: 12/710,567

(22) Filed: Feb. 23, 2010

(65) Prior Publication Data

US 2010/0246726 A1 Sep. 30, 2010

(30) Foreign Application Priority Data

Mar. 31, 2009 (GB) .................................. 0905551.8

(51) Int. Cl.
*H03D 1/04* (2006.01)
(52) U.S. Cl.
USPC ........................................................ 375/346
(58) Field of Classification Search
USPC ... 375/316, 340, 346; 370/203, 210; 708/100, 708/200, 400, 403, 404, 405
See application file for complete search history.

(56) References Cited

U.S. PATENT DOCUMENTS

| | | | | |
|---|---|---|---|---|
| 2003/0210749 | A1* | 11/2003 | Asjadi | 375/260 |
| 2005/0111561 | A1 | 5/2005 | Sedarat et al. | |
| 2005/0213692 | A1* | 9/2005 | Zhidkov | 375/346 |
| 2006/0198453 | A1 | 9/2006 | Huang et al. | |
| 2009/0034407 | A1 | 2/2009 | Lindh | |
| 2009/0097596 | A1* | 4/2009 | Li et al. | 375/341 |

FOREIGN PATENT DOCUMENTS

| | | |
|---|---|---|
| EP | 1 361 719 A2 | 11/2003 |
| GB | 2 404 542 B | 9/2005 |
| WO | WO 2006/038052 A1 | 4/2006 |

OTHER PUBLICATIONS

U.S. Appl. No. 12/783,245, filed May 19, 2010, Asjadi.
Extended Search Report issued Dec. 23, 2011 in Europe Application No. 10250299.4.

* cited by examiner

*Primary Examiner* — Chieh M Fan
*Assistant Examiner* — Vineeta Panwalkar
(74) *Attorney, Agent, or Firm* — Oblon, Spivak, McClelland, Maier & Neustadt, L.L.P.

(57) ABSTRACT

A receiver recovers data from Orthogonal Frequency Division Multiplexed (OFDM) symbols, the OFDM symbols including sub-carrier symbols carrying data symbols and sub-carrier signals carrying pilot symbols. The receiver includes a Fourier transform processor arranged in operation to receive a time domain digital version of the OFDM symbols and to form a frequency domain version of the OFDM symbols, from which the pilot symbol sub-carriers and the data symbol bearing sub-carriers can be recovered, and a detector arranged in operation to recover the data symbols from the data bearing sub-carriers of the OFDM symbols.

16 Claims, 10 Drawing Sheets

IND Detection: The relationship between the InstPower & Threshold

FIG. 13

IND Detection: The relationship between the InstPower & Threshold

FIG. 14

Performance Comparison of IND Methods [simulated impulsive interference: DTG Type 1]

FIG. 15a

Performance Comparison of IND Methods [simulated impulsive interference: DTG Type 2]

FIG. 15b

RECEIVER AND METHOD OF RECEIVING

FIELD OF INVENTION

The present invention relates to receivers and methods for recovering data from Orthogonal Frequency Division Multiplexed (OFDM) symbols, the OFDM symbols including a plurality of sub-carrier symbols, some of the sub-carrier symbols being assigned to carry data and some of the sub-carrier signals being assigned to carry pilot symbols.

BACKGROUND OF THE INVENTION

There are many examples of radio communications systems in which data is communicated using Orthogonal Frequency Division Multiplexing (OFDM). Systems which have been arranged to operate in accordance with Digital Video Broadcasting (DVB) standards for example, utilise OFDM. OFDM can be generally described as providing K narrow band sub-carriers (where K is an integer) which are modulated in parallel, each sub-carrier communicating a modulated data symbol such as Quadrature Amplitude Modulated (QAM) symbol or Quadrature Phase-shift Keying (QPSK) symbol. The modulation of the sub-carriers is formed in the frequency domain and transformed into the time domain for transmission. Since the data symbols are communicated in parallel on the sub-carriers, the same modulated symbols may be communicated on each sub-carrier for an extended period, which can be longer than a coherence time of the radio channel. The sub-carriers are modulated in parallel contemporaneously, so that in combination the modulated carriers form an OFDM symbol. The OFDM symbol therefore comprises a plurality of sub-carriers each of which has been modulated contemporaneously with different modulation symbols.

To facilitate detection and recovery of the data at the receiver, the OFDM symbol can include pilot sub-carriers, which communicate data-symbols known to the receiver. The pilot sub-carriers provide a phase and timing reference, which can be used to estimate an impulse response of the channel through which the OFDM symbol has passed, to facilitate detection and recovery of the data symbols at the receiver. In some examples, the OFDM symbols include both Continuous Pilot (CP) carriers which remain at the same relative frequency position in the OFDM symbol and Scattered Pilots (SP). The SPs change their relative position in the OFDM symbol between successive symbols, providing a facility for estimating the impulse response of the channel more accurately with reduced redundancy.

Although OFDM modulation systems and more particularly DVB can provide a robust technique for communicating data in the presence of time and frequency selective fading and Gaussian noise, detecting and recovering data in the presence of impulsive burst noise, induced during transmission or at the receiver input, presents a technical problem.

SUMMARY OF INVENTION

According to an aspect of the present invention there is provided a receiver for recovering data from Orthogonal Frequency Division Multiplexed (OFDM) symbols, the OFDM symbols including a plurality of sub-carrier symbols, some of the sub-carrier symbols carrying data symbols and some of the sub-carrier signals carrying pilot symbols. The receiver comprises a demodulator which is arranged in operation to detect a signal representing the OFDM symbols, and to generate a sampled digital version of the OFDM symbols in the time domain, a Fourier transform processor arranged in operation to receive the time domain digital version of the OFDM symbols and to form a frequency domain version of the OFDM symbols, from which the pilot symbol sub-carriers and the data symbol bearing sub-carriers can be recovered. A detector is arranged to recover the data symbols from the data bearing sub-carriers of the OFDM symbols. The receiver includes a noise estimator arranged in operation to generate a long term estimate of noise power in the frequency domain version of the OFDM symbols at a plurality of frequencies, by accumulating an average noise power at the plurality of frequencies from a plurality of the OFDM symbols, and for generating an estimate of a current level of the noise power in the frequency domain version of a current one of the OFDM symbols at the plurality of frequencies. An impulsive noise detector is arranged in operation to detect the presence of an impulse of noise in the current OFDM symbol, by comparing the noise power in the current OFDM symbol with the long term noise power at the plurality of frequencies, and to generate an impulse noise flag to indicate that the current OFDM symbol is affected by an impulse of noise if the comparison indicates the presence of an impulse of noise. The detector is arranged to conceal the effect of the impulse noise on the recovering of the data symbols from the data bearing sub-carriers in response to the generated impulse noise flag.

In accordance with embodiments of the present invention a computationally efficient and effective technique is used to detect the presence of a burst of impulse noise and to conceal the effects of the impulse of noise on the detection process. The technique is performed and has reduced complexity compared with a technique disclosed in European patent application 03252678.2 by the same inventor. Impulsive noise in the time domain will generate an increase in noise level across the entire frequency bandwidth of the OFDM symbols. Therefore an impulse of noise can be detected if all frequencies experience an increase in the noise level. Thereafter the detector can conceal the effect of the impulse noise on the recovering of the data symbols from the data bearing sub-carriers, for example by adapting channel state information for use in de-mapping modulated symbols into data symbols, or not including the noise power determined for the current OFDM symbol in the estimate of the long term the noise power.

There are various techniques envisaged for estimating the long term noise power in the frequency domain version of the OFDM symbols at the plurality of frequencies, and the level of the noise power in the current OFDM symbol at the plurality of frequencies. In one example, the estimate of the noise power can be generated by comparing the received pilot sub-carrier symbols with a regenerated version of the pilot sub-carrier symbols, which are known to the receiver. The pilot sub-carrier symbols may be continuous pilot sub-carrier symbols or scattered sub-carrier symbols within the OFDM symbols or both. In another example, the pilot sub-carrier symbols include pilot sub-carriers symbols which are transmitted outside a frequency bandwidth occupied by the OFDM symbols. These are known as "silent carriers".

In some embodiments the OFDM symbols are transmitted in accordance with a Digital Video Broadcasting standard, such as DVB-T, DVB-T2, DVB-H or DVB-C2.

Various aspects and features of the present invention are defined in the appended claims. Further aspects of the present invention include a method recovering data from Orthogonal Frequency Division Multiplexed (OFDM) symbols.

BRIEF DESCRIPTION OF DRAWINGS

Embodiments of the present invention will now be described by way of example only with reference to the accompanying drawings, wherein like parts are provided with corresponding reference numerals, and in which.

DESCRIPTION OF PREFERRED EMBODIMENTS

In general, in an OFDM receiver, the detection and cancellation of impulsive noise can either occur in the time domain (pre FFT) or in the frequency domain (post FFT). Time-based algorithms detect the presence of impulse noise on the incoming digital samples and scale the affected samples intelligently. This type of noise cancellation is quite effective for short duration impulsive interference. The other short-coming is the loss of detection for low-energy noise bursts. In fact increasing the sensitivity, to pick up low-level impulsive noise, can lead to false-detection. This is due to an inherent nature of the OFDM signal, which includes large peak-to-average power ratios.

An alternative low-complexity frequency-domain algorithm, Impulsive Noise Detection (IND), has been developed that can complement a time domain impulsive noise cancellation or to be used on its own.

Figure 1:
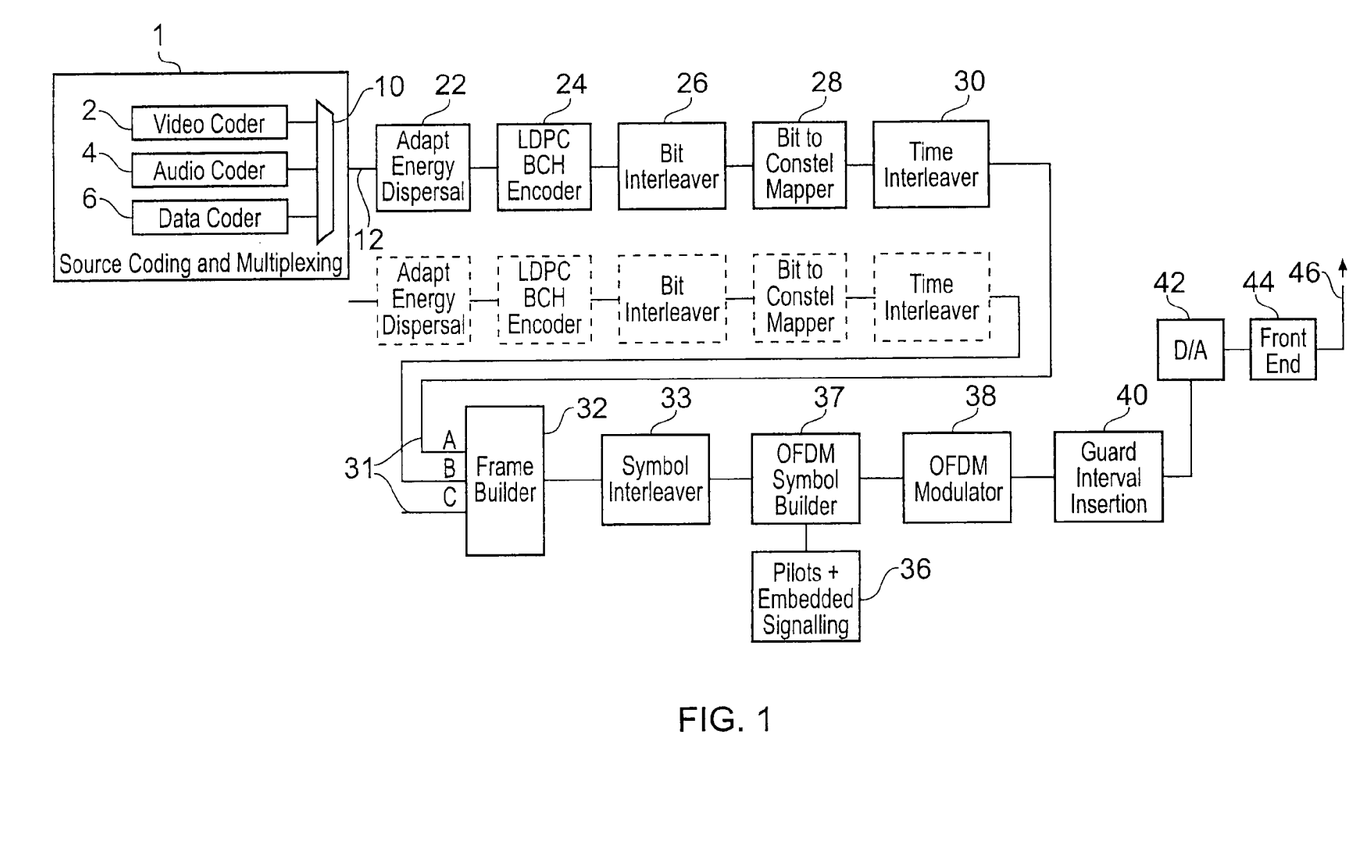
FIG. 1 is a schematic block diagram of an OFDM transmitter which may be used, for example, with the DVB-T2 standard.

FIG. 1 provides an example block diagram of an OFDM transmitter which may be used for example to transmit video images and audio signals in accordance with the DVB-T, DVB-H, DVB-T2 or DVB-C2 standard. In FIG. 1 a program source generates data to be transmitted by the OFDM transmitter. A video coder 2, and audio coder 4 and a data coder 6 generate video, audio and other data to be transmitted which are fed to a program multiplexer 10. The output of the program multiplexer 10 forms a multiplexed stream with other information required to communicate the video, audio and other data. The multiplexer 10 provides a stream on a connecting channel 12. There may be many such multiplexed streams which are fed into different branches A, B etc. For simplicity, only branch A will be described.

As shown in FIG. 1 an OFDM transmitter receives the stream at a multiplexer adaptation and energy dispersal block 22. The multiplexer adaptation and energy dispersal block 22 randomises the data and feeds the appropriate data to a forward error correction encoder 24 which performs error correction encoding of the stream. A bit interleaver 26 is provided to interleave the encoded data bits which for the example of DVB-T2 is the LDCP/BCH encoder output. The output from the bit interleaver 26 is fed to a bit into constellation mapper 28, which maps groups of bits onto a constellation point of a modulation scheme, which is to be used for conveying the encoded data bits. The outputs from the bit into constellation mapper 28 are constellation point labels that represent real and imaginary components. The constellation point labels represent data symbols formed from two or more bits depending on the modulation scheme used. These can be referred to as data cells. These data cells are passed through a time-interleaver 30 whose effect is to interleave data cells resulting from multiple LDPC code words.

The data cells are received by a frame builder 32, with data cells produced by branch B etc in FIG. 1, via other channels 31. The frame builder 32 then forms many data cells into sequences to be conveyed on OFDM symbols, where an OFDM symbol comprises a number of data cells, each data cell being mapped onto one of the sub-carriers. The number of sub-carriers will depend on the mode of operation of the system, which may include one of 1k, 2k, 4k, 8k, 16k or 32k, each of which provides a different number of sub-carriers according, for example to the following table:

| Number of Sub-carriers Adapted from DVB-T/H | |
|---|---|
| Mode | Data Sub-carriers |
| 1K | 756 |
| 2K | 1512 |
| 4K | 3024 |
| 8K | 6048 |
| 16K | 12096 |
| 32K | 24192 |

The sequence of data cells to be carried in each OFDM symbol is then passed to the symbol interleaver 33. The OFDM symbol is then generated by an OFDM symbol builder block 37 which introduces pilot and synchronising signals fed from a pilot and embedded signal former 36. An OFDM modulator 38 then forms the OFDM symbol in the time domain which is fed to a guard insertion processor 40 for generating a guard interval between symbols, and then to a digital to analogue convertor 42 and finally to an RF amplifier within an RF front end 44 for eventual broadcast by the COFDM transmitter from an antenna 46.

Frame Format

Figure 2:
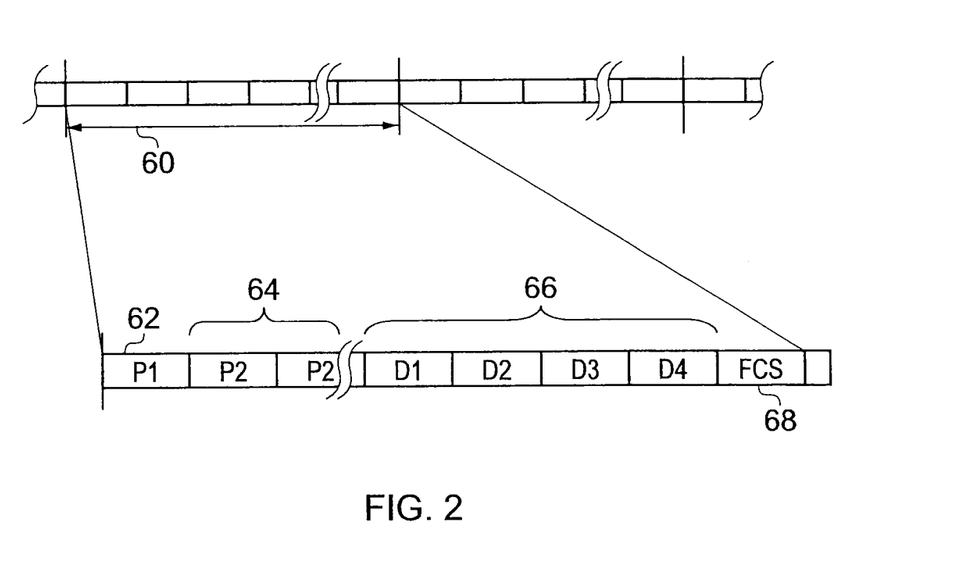
FIG. 2 is an example illustration of a super frame structure according to the DVB-T2 standard.

For the DVB-T2 system, the number of sub-carriers per OFDM symbol can vary depending upon the number of pilot and other reserved carriers. An example illustration of a "super frame" according to the DVB-T2 standard is shown in FIG. 2.

Thus, in DVB-T2, unlike in DVB-T, the number of sub-carriers for carrying data is not fixed. Broadcasters can select one of the operating modes from 1k, 2k, 4k, 8k, 16k, 32k each providing a range of sub-carriers for data per OFDM symbol, the maximum available for each of these modes being 1024, 2048, 4096, 8192, 16384, 32768 respectively. In DVB-T2 a physical layer frame is composed of many OFDM symbols. Typically the frame starts with a preamble or P1 symbol as shown in FIG. 2, which provides signalling information relating to the configuration of the DVB-T2 deployment, including an indication of the mode. The P1 symbol is followed by one or more P2 OFDM symbols 64, which are then followed by a number of payload carrying OFDM symbols 66. The end of the physical layer frame is marked by a frame closing symbols (FCS) 68. For each operating mode, the number of sub-carriers may be different for each type of symbol. Furthermore, the number of sub-carriers may vary for each according to whether bandwidth extension is selected, whether tone reservation is enabled and according to which pilot sub-carrier pattern has been selected. As such a generalisation to a specific number of sub-carriers per OFDM symbol is difficult.

Receiver

Figure 3:
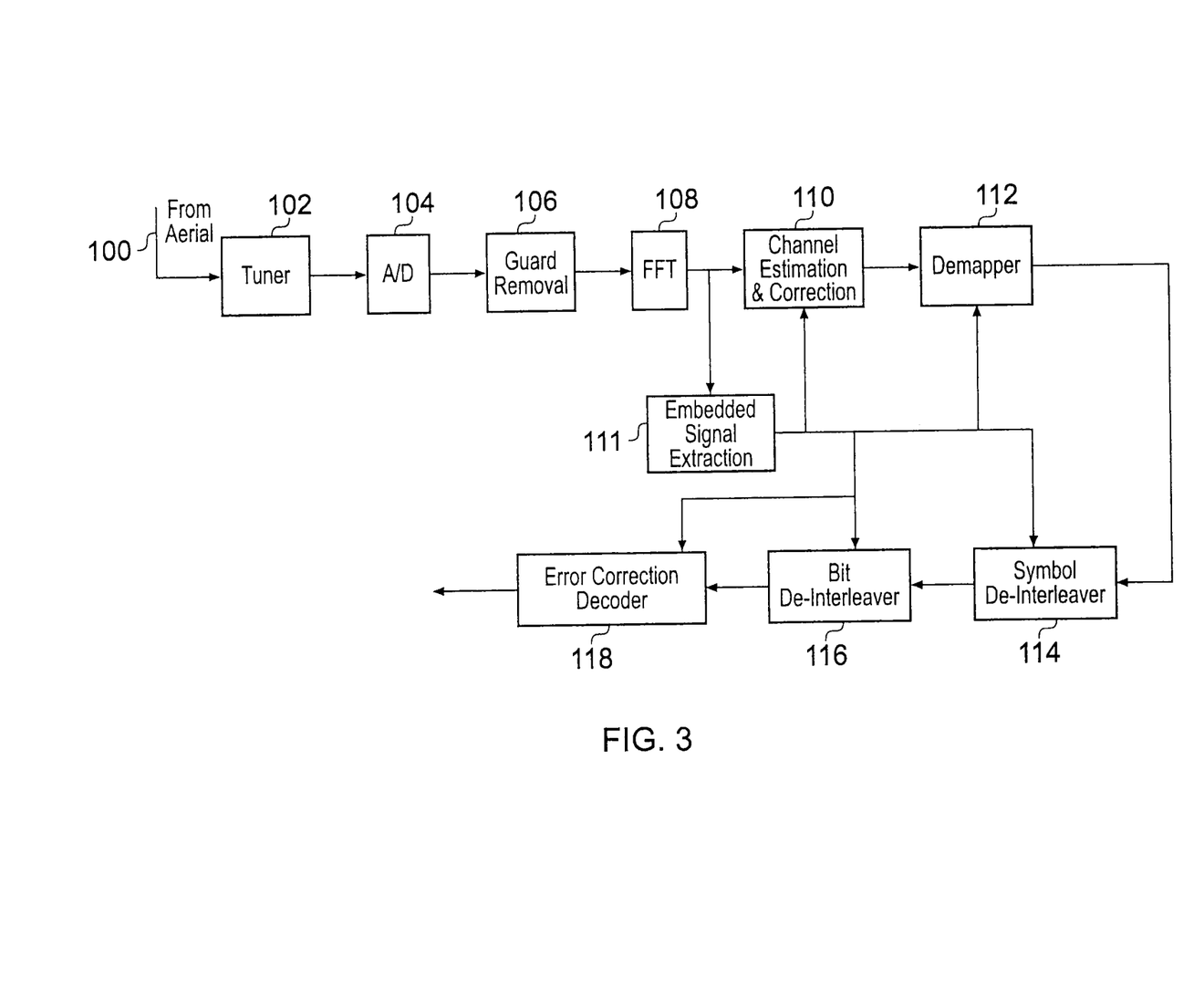
FIG. 3 is a schematic block diagram of an OFDM receiver which may be used, for example, with the DVB-T or DVB-T2 standard.

FIG. 3 provides an example illustration of a receiver which may be used with the present technique. As shown in FIG. 3, an OFDM signal is received by an antenna 100 and detected by a tuner 102 and converted into digital form by an analogue-to-digital converter 104. A guard interval removal processor 106 removes the guard interval from a received OFDM symbol, before the data is recovered from the OFDM symbol using a Fast Fourier Transform (FFT) processor 108 in combination with a channel estimator and corrector 110 and an embedded-signalling decoding unit 111. The demodulated data is recovered from a de-mapper 112 and fed to a symbol de-interleaver 114, which operates to effect a reverse mapping of the received data symbol to re-generate an output data stream with the data de-interleaved. Similarly, the bit de-interleaver 116 reverses the bit interleaving performed by the bit interleaver 26. The remaining parts of the OFDM receiver shown in FIG. 3 are provided to effect error correction decoding 118 to correct errors and recover an estimate of the source data.

Frequency Domain Impulsive Noise Detection and Cancellation

The present technique provides an efficient and effective detection and concealment process of impulsive noise. The inventor has disclosed in European patent application 03252678.2 a technique for detecting the presence of impulse noise in a received OFDM symbol and providing an accurate estimate of that noise for cancellation. However, that technique is relatively computationally complex because both a time based estimate of the location of a burst of noise, a frequency domain estimate of that burst noise, as well as an inverse Fourier transform of that burst noise from the frequency to the time domain, is required. Furthermore, the disclosed technique envisages cancelling that burst of noise from the received OFDM signal.

Figure 4:
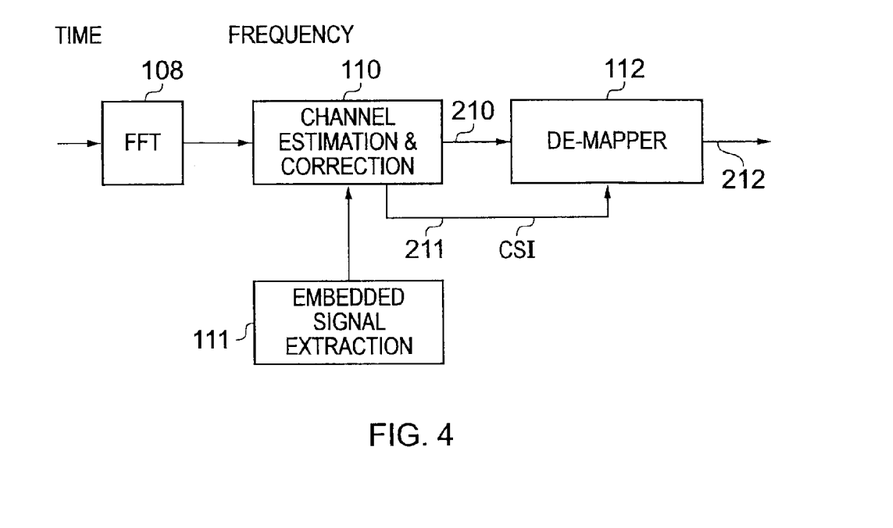
FIG. 4 is a schematic block diagram of some of the component parts from the block diagram of the OFDM receiver of FIG. 3, which assist in explanation of the present technique.

The present technique utilises an estimation of an impulse or burst of noise in the frequency domain only and a concealment technique which is computationally efficient and effective. The parts of the receiver shown in FIG. 3 which influence the frequency domain detection and concealment of an impulse of noise are illustrated in FIG. 4. As shown in FIG. 4 after the current OFDM symbol is converted to the frequency domain by the FFT processor 108, it is passed to the channel estimation correction processor 110. The channel estimation correction processor 110 passes the data bearing sub-carriers to a modulation symbol to data symbol de-mapper 112 which maps the received modulation symbols onto data symbols representing data bits according to the modulation scheme used, for example, QPSK. The data symbols are then fed to the symbol de-interleaver 114. Thus the channel estimator and corrector 110 feeds received data symbols on a connecting channel 210 to the de-mapper 112 and on a separate channel 211, an indication of the current channel state information (CSI) which is used in the de-mapping process to form the output data symbols on channel 212.

The basic principal of the impulsive noise detection (IND) algorithm are:

1. To detect the presence of impulsive interference per OFDM symbol (detection) by continuously comparing instantaneous noise power with long-term average. Any short and sudden increase is considered as impulsive noise.

2. To minimize the impact of impulsive noise on short-term and long-term performance of the channel estimation and correction, which is referred to as concealment. The concealment can be performed by stopping some or all blocks with memory from noise contamination or any sudden modification, while impulsive noise is present and/or modify the channel state indication (CSI) computation to use an instantaneous noise power rather than the long term average noise power. As a result a reduction in the number of errors in the detected data can be effected.

Figure 5:
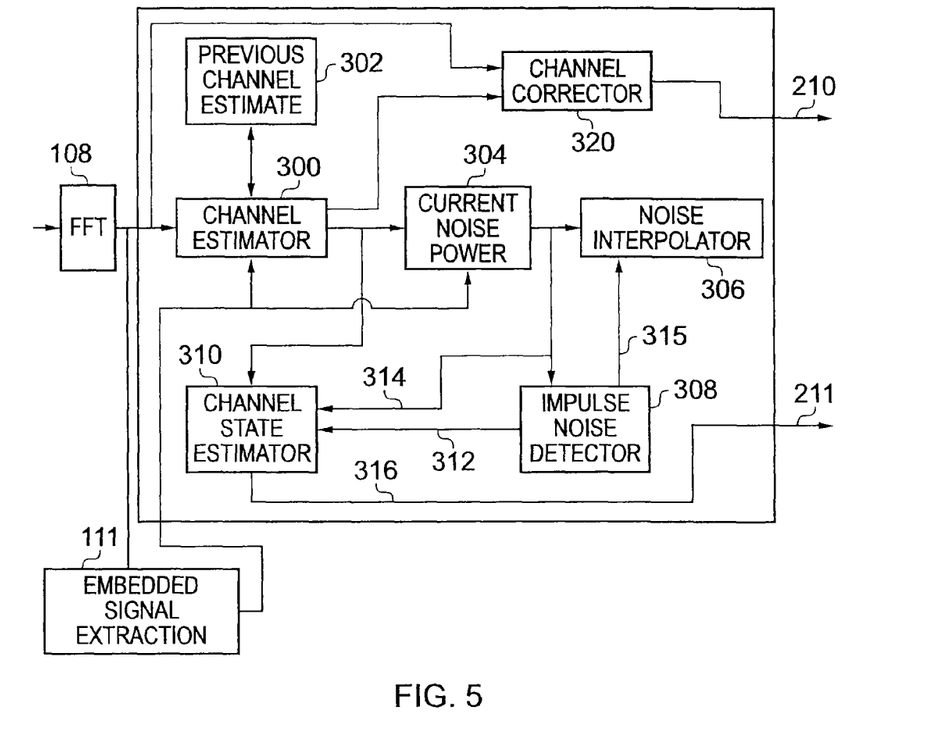
FIG. 5 is a schematic block diagram showing an example illustration of a channel estimator and corrector block shown in FIGS. 3 and 4.

A more detailed illustration of the channel estimator and corrector 110 is illustrated in FIG. 5.

In FIG. 5 the channel estimator and corrector 110 includes a channel estimator 300 which also receives as an input a signal from the embedded signal extraction circuit 111. The embedded signal and extraction circuit 111 serves to extract the continuous and scattered pilot sub-carrier symbols from the current OFDM symbol. The channel estimator 300 also receives data from a previous channel estimate store 302, which may include scattered and continuous sub-carrier pilot symbols from previous OFDM symbols which are used to form an estimate of the channel for the current OFDM symbol.

There are various techniques for generating an estimate of the channel impulse response and so a detailed explanation will not be provided here. However, the channel estimator forms an estimate of the impulse response of the channel through which the OFDM symbol has passed, based on the extracted continuous and scattered pilots from that OFDM symbol. The process for estimation may include interpolating between samples of the channel provided at the continuous and scattered pilot carrier locations, and may also utilise a longer term estimate of the state of the channel impulse response determined from previous estimates of the channel. Thus when extracted and generated the channel impulse response is then stored in the previous channel estimate store 302.

The channel impulse response estimate is then fed to a current noise power estimator 304. The current noise power estimator 304 generates a current estimate of the noise power in the received OFDM symbol by comparing the complex values of the pilot sub-carrier symbols received in the OFDM symbol after the effects of the channel have been removed with a regenerated version of those pilot symbols. Thus, the current estimate of noise power is generated by comparing the pilot sub-carriers with the values they should be after the effects of the channel have been removed. As explained below, in another example the estimate of the noise power in the current OFDM symbol is generated from silent carrier symbols which are transmitted in out-of-band frequency components of the OFDM signal. The current noise power estimator is then fed to a noise interpolator 306 and an impulse noise detector 308.

As explained below, the impulse noise detector 308 generates a flag indicative of whether the current OFDM symbol has been corrupted by a burst of impulse of noise. It does this by comparing the current estimate of the noise power of the received OFDM symbol with the long term average noise power for previous OFDM symbols. This is because an impulse of noise will have an effect for generating noise across the entire bandwidth of the received OFDM symbol and therefore all of the pilots will experience approximately the same increase in noise level. Thus, by comparing the increase in noise power across a plurality of frequencies of the OFDM signal, such as all of the pilot symbols of OFDM symbols, it is possible to detect the presence of an impulse of noise.

As explained below there are various ways in which this detected impulse noise can be concealed. In one example the impulse noise detector 308 feeds a flag to a channel state estimator 310 via channel 312. The channel state estimator 310 also receives an indication of the current noise power from the current noise power estimator 304 via a channel 314. The channel state estimator 310 therefore generates an indication of the relative state of the channel for the currently received OFDM symbol which is generated on an output channel 316 and fed to the de-mapper 112 via an output channel 211. As explained below the channel state estimator 310 generates a complex noise component value which is then off-set in the de-mapping process in order to more accurately map the received data bearing sub-carrier signals into data signals.

An output from the channel estimator 300 is received by a channel corrector 320, which also receives the current OFDM symbol. The channel corrector 320 operates to cancel as far as possible the effects of the channel impulse response from the modulated symbols provided by the data bearing sub-carriers of the OFDM symbol. The modulated symbols are then fed from the channel corrector 320 to the de-mapper 112 via output of channel 210 for feeding.

Impulsive Noise Detection

Two techniques are provided for estimating the noise power in the current OFDM symbol which can also be used to generate an accumulated average of the noise power in the received OFDM symbols. The first technique provides an adaptation of the channel estimator 300 to utilise a number of techniques, which can be deployed to estimate the noise power at the continuous pilot (CP) or scattered pilots (SP) or bath. These signals are then combined and integrated over a number of OFDM symbols to produce the decimated noise power signal, which forms the long term average signal power measurement.

Figure 6:
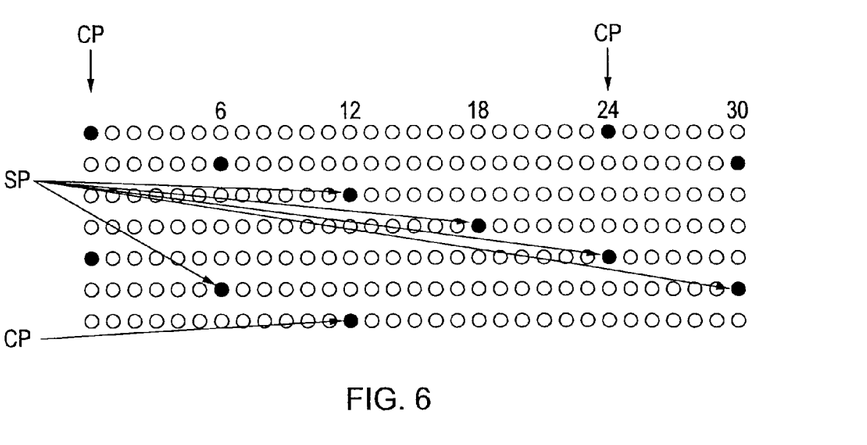
FIG. 6 is a schematic illustration of an example sequence of OFDM symbols, showing scattered and continuous pilot carrier symbols.

As will be appreciated by those familiar with DVB-T, pilot sub-carrier signals are provided throughout the OFDM symbol, some of which are continuous, that is they are in a fixed position within the OFDM symbol and some of the pilot carriers are scattered in that their position moves from one symbol to another. For DVB-T2 there are various patterns of pilot carrier symbols which change for each symbol throughout the super frame. As shown in FIG. 6, an example illustration of the continuous pilot carriers CP and scattered pilot carrier SP are shown.

For the purpose of impulsive noise detection, either of the two noise power signals (CP or SP) can be used or both. CP noise power signal is preferred due to smaller number of CPs in order to reduce complexity. For every OFDM symbol, both the averaged and the instantaneous noise power vectors are measured. The mean value of each vector, 'AvgCPpower' and 'InstCPpower', are computed.

Thus as will be appreciated, in one example, the channel estimator 300 can require knowledge of the previous scattered pilot carrier positions so that an interpolation can be performed in order to generate estimates of the channel impulse response at each of the respective sub-carrier locations throughout the OFDM symbol. The first technique is to estimate the noise in the received OFDM symbol by removing the effects of the channel impulse response from the received continuous and/or scattered pilots and estimating the noise at each of the scattered and continuous pilots. Because the impulse noise will effect all carriers across the frequency to domain, the average estimate of the noise at each of the pilot carriers provides an estimate of the impulse noise. This impulse noise can then be compared with the long term average in order to detect the presence of any impulsive noise. Thus, if the noise power of the current OFDM symbol exceeds the average accumulated noise for the previous N-OFDM symbols by greater than a pre-determined threshold then the impulse noise detector 308 determines that the current OFDM symbol has been affected by an impulse of noise. For example, if the current measurement of noise power across the frequency spectrum of the OFDM symbol is above 25% of the long term noise power then an impulse of noise can be determined to be present. Other example thresholds for detecting an impulse of noise with respect to the long term average include using other percentage increases or absolute values. For example, an impulsive noise flag can set whenever the ratio of the two noise powers exceeds a user-defined threshold. The pseudo code for this example is as follows:

```
Threshold = ThresholdFactor*AvgCPpower;
If (8*InstCPpower > Threshold) {
  NoiseFlag = 1;
}
``` where ThresholdFactor is a user-define register.

In order to determine the noise from the continuous and the scattered pilots, it might be necessary to duplicate the hardware associated with the CP or SP noise estimation outside the channel estimator and corrector 110. This is to facilitate the generation of the impulse noise detection flag for the current OFDM symbol to the channel estimator and corrector 110 contemporaneously. If this were the case it could increase the hardware complexity.

Figure 7:
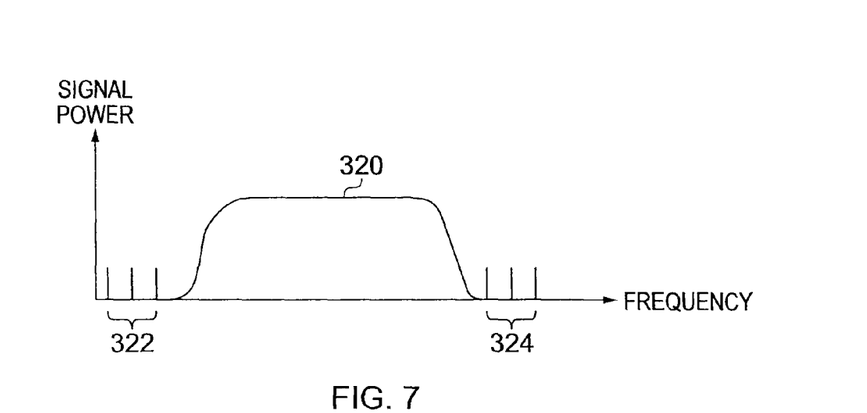
FIG. 7 is a graphical representation of a plot of signal level against frequency illustrating a spectrum occupied by example OFDM symbols and silent carriers.

A second technique for generating an estimation of the accumulated noise and detecting the presence of an impulse of noise is shown in FIG. 7. In FIG. 7 a graphical representation is provided of signal component power with respect to frequency.

A central portion 320 in FIG. 7 illustrates a spectral occupancy of the OFDM symbols. However, as part of the DVB standard there is also provided some out of band carrier symbols known as "silent carriers" at a lower spectral position and an upper spectral position 322, 324 with respect to the OFDM symbol 320. Again by removing the effects of the channel impulse response on these silent carrier symbols, an amount of noise present for each of the silent sub-carrier symbols can be determined in order to provide an indication of the noise across the available band-width. Thus, if the average noise in the lower bandwidth portion 322 and a upper bandwidth portion 324 is significantly above a long term average, then it can be determined that the current OFDM symbol has been detected in the presence of an impulse of noise. Accordingly, the impulse noise detector 308 can receive the silent pilot sub-carriers from the embedded signal extraction circuit 311 in order to estimate whether or not the current OFDM symbol has been detected in the presence of an impulse of noise.

Estimating the noise power using the silent carriers is similar to using the continuous and scattered pilots, but can be implemented with reduced complexity. Most of the logic is exactly the same as with only replacing the continuous pilot noise estimation signal with the silent carrier vector. There are a number of silent carriers in the DVB-T receiver (243 in 2k mode and 1375 in 8k mode). When impulsive interference passes through the FFT block, the noise energy is flattened across all carriers including silent carriers. If the impulse noise has been filtered prior to reaching the FFT, then this should not effect the calculation because a relative measurement is being performed i.e. the instantaneous noise power on the silent carriers is being compared with the averaged noise power.

It is not required to use the entire range of silent carriers and a reasonable sub-set would suffice. In one example, the subset of silent carriers is as below and equally distributed on both sides. The table below illustrates an example of the number of silent carriers used for each transmission mode.

| DVB Mode | Number of silent carriers used |
|---|---|
| 2k | 256 |
| 4k | 512 |
| 8k | 1024 |

This second technique for estimating the impulse noise provides a reduced complexity estimation, because the computation of silent carriers comes at no extra cost as they are always computed but in fact thrown away. It is also worth mentioning that monitoring of the energy on silent carriers might have other usage as it indicates the energy leakage.

It is also interesting to note that a slight reduction in the dynamic range of the principal noise signal can be produced using the silent carriers. One explanation for this is the heavy filtering of the impulsive noise at filter stop bands. This, however, has not prevented this scheme from identifying the presence of impulsive noise.

Impulse Noise Flat Control

In some examples the impulsive noise flag is issued immediately for the current OFDM symbol where impulse noise is present and then it is reset for subsequent and consecutive OFDM symbols. Otherwise, it would stop a number of operations from updating for a large period of time as part of the concealment and this is not desirable. This is one feature of this detection algorithm, which can be thought of as an 'edge detection' process. This aspect of the algorithm is illustrated by FIG. 8.

Figure 8:
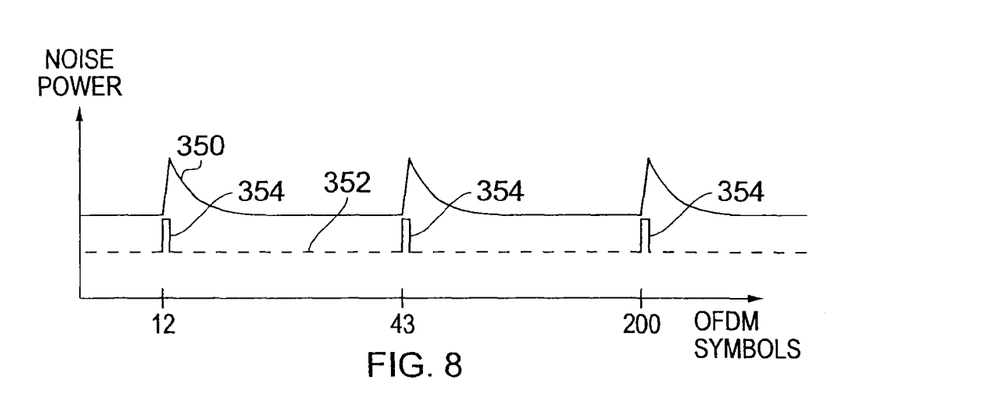
FIG. 8 is a graphical representation of a plot of noise power and a plot of an impulse noise detection flag against a number of OFDM symbols.

As shown in FIG. 8, having detected the presence of an impulse of noise, the impulse noise detector 308 sets the flag to indicate that the current OFDM symbol has been corrupted by a burst of impulse noise. However, having set this flag, the impulse noise detector 308 increases a relative threshold above which it would determine that there is an impulse of noise present in order to not continuously raise the impulse noise flag for subsequent symbols. This forms the "edge" detection mentioned above. As such an arrangement is shown graphically in FIG. 8, which illustrates a relative noise power for a sequence of OFDM symbols using a graphical plot 350 with respect to a dashed line 352 which shows comparatively whether the impulse noise flag is raised or lowered. Thus, a line of peaks 354 provide illustrations of points at which the impulsive noise detection flag is raised.

Concealment

As discussed above, concealment can be effected using two functions; (i) freezing all update processes during noisy intervals, (ii) reporting a sudden increase in noise level. To perform these tasks, a number of switches are placed in the channel estimator and corrector 110 to turn these updates on/off depending on the status of the impulse noise detection flag. The second part of the concealment, switches between 'averaged noise' (when impulsive noise is not present) and 'instantaneous noise' (when impulsive noise is present) leading to the generation of more faithful CSI (channel status information). This in turn aids the de-mapper when impulse noise is present.

Figure 9:
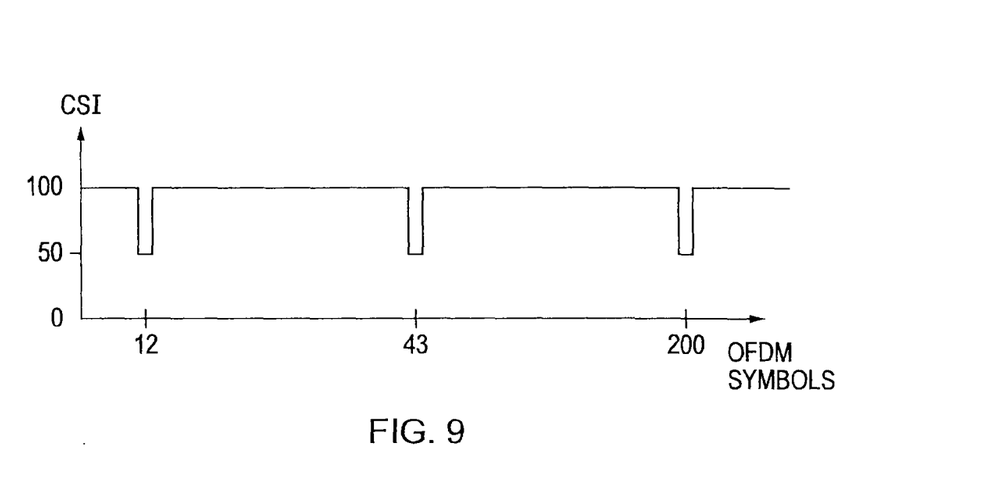
FIG. 9 is a graphical representation showing a plot of channel state information (CSI) with respect to a number of OFDM symbols.
Figure 10:
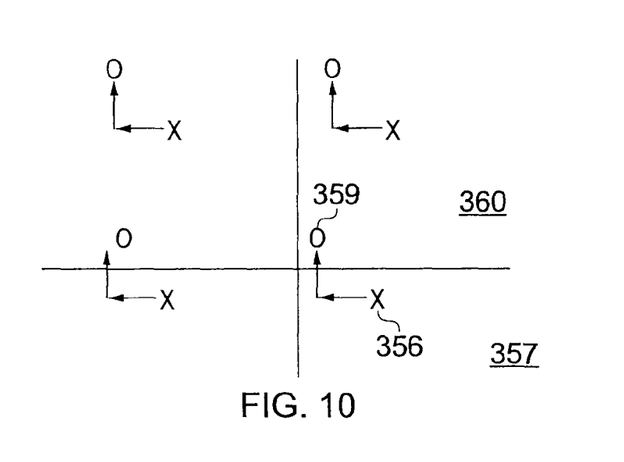
FIG. 10 provides a graphical representation of a complex plane in which the position of QPSK/QAM symbols are shown before and after being adapted in accordance with channel state information.

One example is illustrated in FIG. 9 which provides a graphical illustration of a determined channel state information which is drawn on the same access as FIG. 8. As shown, the channel state information falls from a relative value of 100 to a relative value of 50 to illustrate that the current OFDM symbol has been received in the presence of impulse noise and as such a relative reduction in the confidence of the received data has been reduced. This can be used to generate soft decision information for decoding error correction encoded data symbols. Furthermore, the channel state estimator 310 can be used to adjust the estimation process in the de-mapper 112. The operation of the de-mapping is illustrated by FIG. 10. The de-mapper 112 maps the received complex modulation data symbols into recovered data symbols in which bits represented from those data symbols can be determined. The channel state information, which provides a representation of signal-to-noise ratio, is used to adjust the received symbol values X to an estimate of those symbol values after taking into account the effect of transmission via the channel. Considering the channel state information, the modulated symbols become as shown in FIG. 10 which are marked as O. As such an improvement can be made in the likelihood of correctly detecting a data symbol which has been transmitted. For example, a recovered modulated symbol X 356 could move from one quadrant 357 of the complex plane 358 to a different quadrant 360, when the channel state information is combined with the symbol to move the symbol to a new position O 359. At this new position 359 the symbol O represents a different pair of encoded bits. Accordingly an increase is provided in the likelihood that the recovered data is correct.

Figure 11:
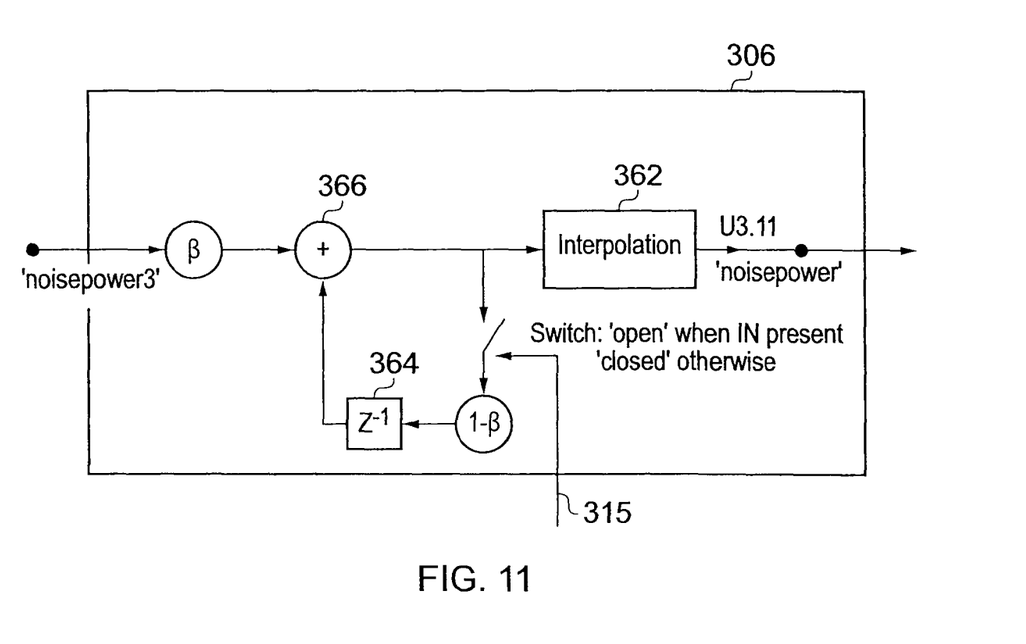
FIG. 11 is a schematic block diagram of a noise interpolator forming part of the channel estimator and corrector shown in FIG. 5.

Another example of concealment can be applied in the noise interpolator 306 which is shown in FIG. 11. As shown in FIG. 11 the impulsive noise detection flag is received via a connecting channel 315 and fed to a switch 360 which is opened when the impulsive noise detection flag is set but closed when it is not set. As such an interpellator 362 and a feed back circuit via a delay element 364 and some of 366 form an interpolation process for accumulating the noise. Therefore, the switch 360 which is opened in response to the impulse noise detection flag prevents the impulse noise from affecting the long term estimate of the noise power in the received OFDM symbols.

Summary of Operation

Figure 12:
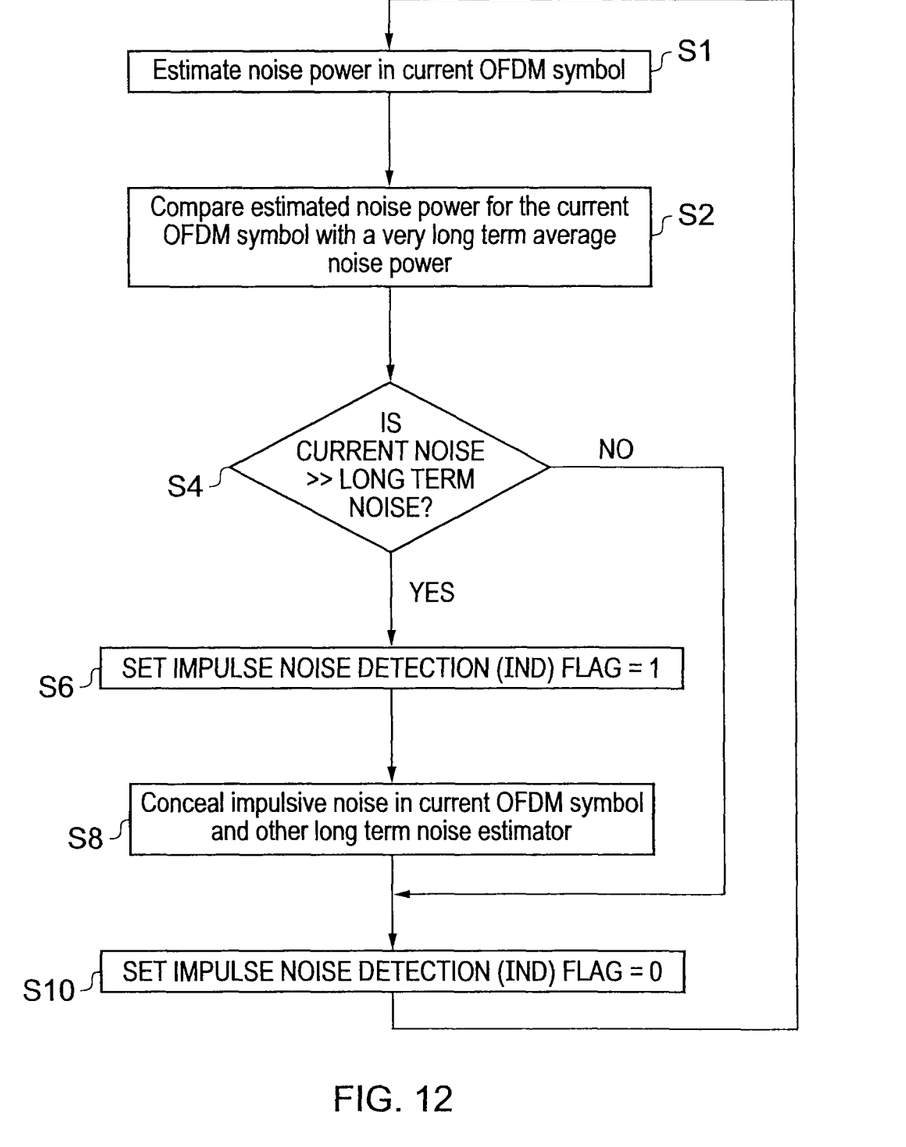
FIG. 12 is an example flow diagram illustrating the operation of an impulse noise detector of FIG. 5.

An example flow diagram illustrating the operation of the present technique to detect whether a received OFDM symbol has been subject to corruption by impulsive noise and concealment is provided in FIG. 12. The process steps illustrated in FIG. 12 are summarised as follows:

S1: The noise power in the currently received OFDM symbol is estimated at a plurality of frequencies within a bandwidth which includes the OFDM symbol. Thus for example, the estimate of the noise power at a plurality of frequencies may be generated by determining noise power for each pilot symbol in an OFDM symbol or from silent carriers which are out of band from the OFDM symbol.

S2: The noise power in the current OFDM symbol is compared with an average noise power determined from a long term average for past N-OFDM symbols.

S4: The current noise power is compared with the long term average noise power. If the level of the current noise power exceeds the long term noise power by greater than a predetermined threshold for example by greater than a predetermined factor multiple of the long term average noise power, then it is determined that the current OFDM symbol has been the subject of corruption by a burst of impulse noise. Otherwise, it is determined that there is no impulse noise present.

S6: If at step S4 it has been determined that the signal has been corrupted by an impulse of noise then at step S6 the impulse noise detection flag (IND) is set true.

S8: After the impulse noise detection flag has been set, the receiver proceeds to as far as possible conceal the impulse noise for the detection process of the current OFDM symbol. For example, the level of impulse noise is not included in the long term average of the noise affecting the reception of OFDM symbols. Similarly, for example the channel state information for detecting the data symbols from the received data bearing sub-carrier symbols is adjusted to account for the impulse of noise. Other examples are also envisaged.

S10: After the impulse noise detection flag has been set high for the current symbol, it is then set low or false for subsequent symbols and a threshold at which it is determined whether an impulse of noise is present is adjusted so that OFDM symbols immediately following the current symbol are not considered as being corrupted by impulse noise.

Results

Figure 13:
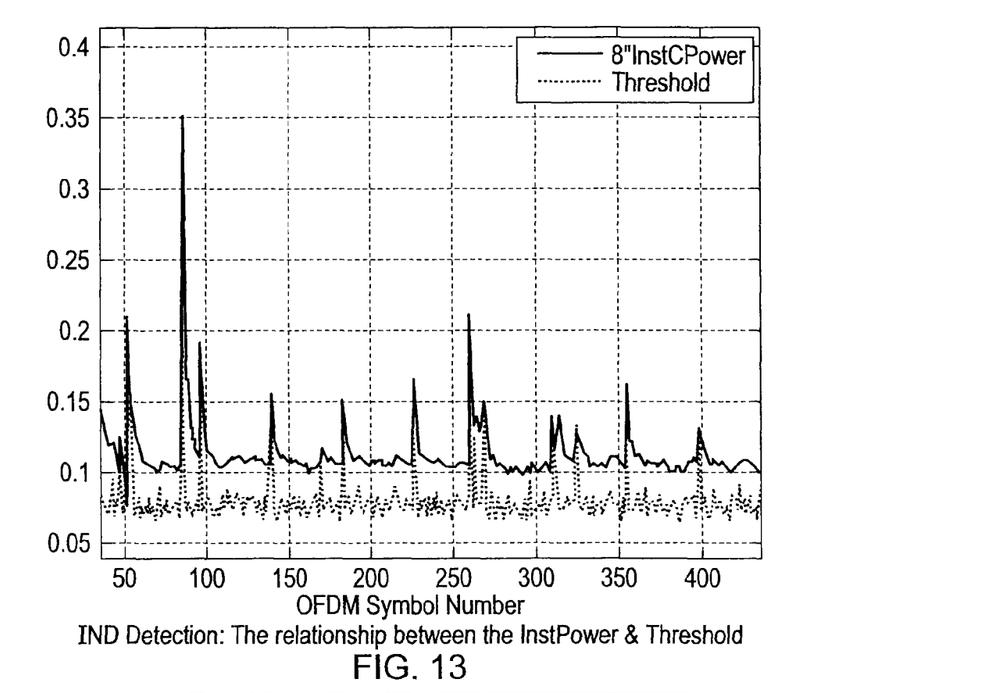
FIG. 13 is a graphical representation illustrating a relationship between instantaneous power and threshold for impulse noise detection for a number of OFDM symbols.
Figure 14:
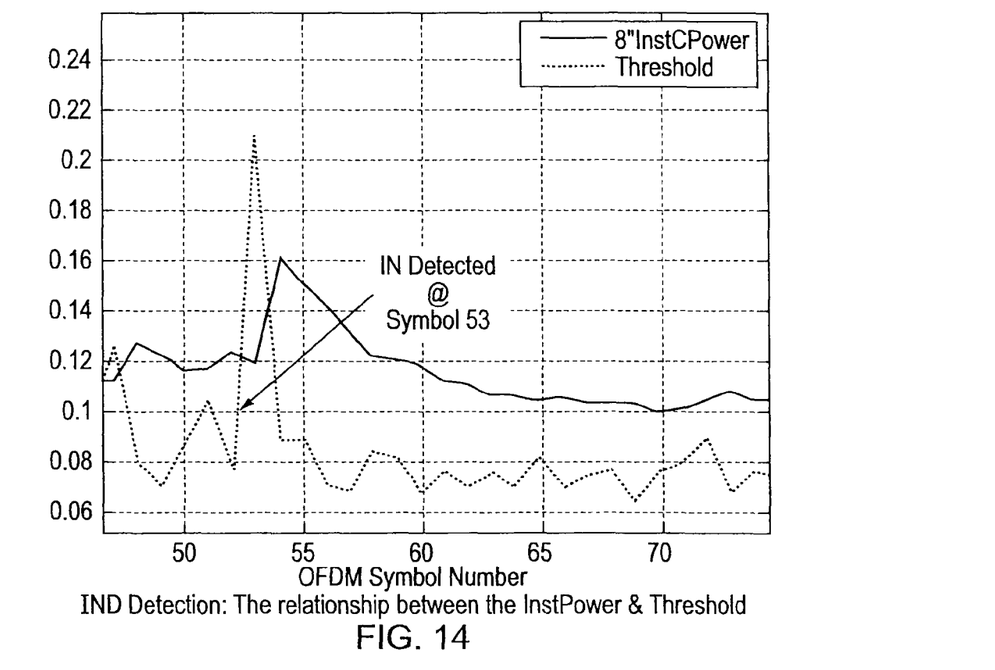
FIG. 14 is a graphical representation illustrating a relationship between instantaneous power and threshold for impulse noise detection for a number of OFDM symbols for an expanded section of FIG. 13.
Figure 15A:
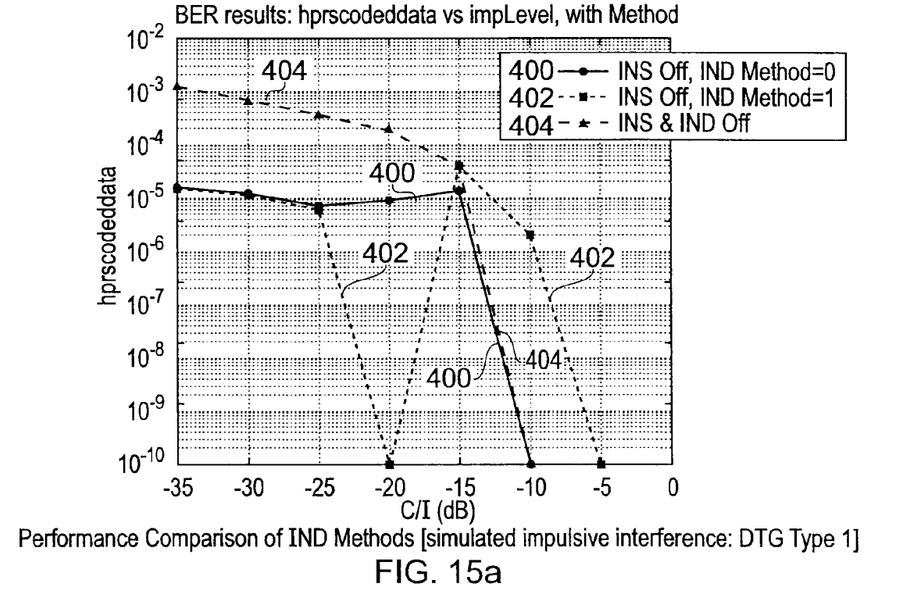
FIG. 15a is a graphical plot of bit error rate of simulated received data against channel to interference ratio illustrating the performance of the impulsive noise detection and concealment method according to the present technique for a DVB-T 2k mode with 64QAM, 2/3 for DTG Type 1 simulated impulsive interference
Figure 15B:
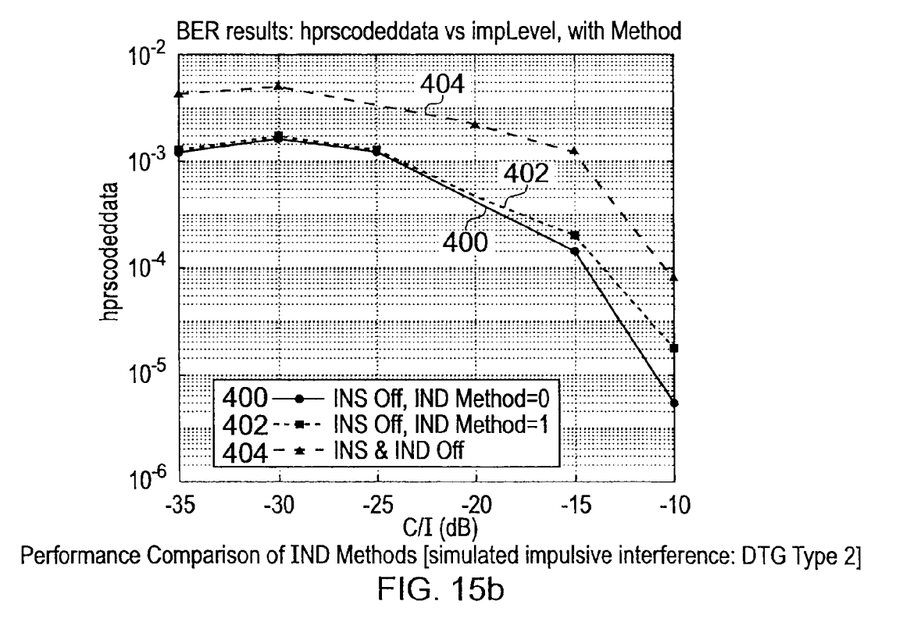
FIG. 15b is a corresponding plot for DTG Type 2 simulated impulsive interference.

An illustration of the performance of a receiver operating in accordance with the present technique is provided in FIGS. 13, 14 and 15. In FIG. 13 a graphical plot is shown to illustrate a relationship between an instantaneous power and a threshold for determining whether or not a burst of noise is present. FIG. 14 shows an extracted area provided on an expanded time-axis to show the relationship between instantaneous power and threshold. As illustrated at symbol 53 there is an impulse of noise detected. FIG. 15 provides example performance for the present technique which is a graph of bit error rate against channel to interference ratio, with simulated impulsive interference DTG Type 1 in FIG. 15a and DTG Type 2 in FIG. 15b. The performance illustrated is for an example represents a DVB-T transmission configuration mode and modulation scheme which is the most sensitive to impulsive interference, which the 2k mode with 64QAM, 2/3. Both of the example performance results of FIGS. 15a and 15b, illustrate a first example 400 for the performance of the impulse noise detection and cancellation method in accordance with the present technique in which the noise is measured using the continuous or scattered pilots, a second example 402 illustrates the performance using the silent pilot carriers to measure the noise and a third example 404 illustrates an example without the noise detection and cancellation method (IND).

As will be appreciated the transmitter and receiver shown in FIGS. 1 and 3 respectively are provided as illustrations only and are not intended to be limiting. For example, it will be appreciated that the present technique can be applied to a different transmitter and receiver architecture.

As mentioned above, embodiments of the present invention find application with DVB standards such as DVB-T, DVB-T2, DVB-C2 and DVB-H, which are incorporated herein by reference. For example embodiments of the present invention may be used in a transmitter or receiver operating in accordance with the DVB-H standard, in hand-held mobile terminals. Services that may be provided may include voice, messaging, interne browsing, radio, still and/or moving video images, television services, interactive services, video or near-video on demand and option. The services might operate in combination with one another. In other examples embodiments of the present invention finds application with the DVB-T2 standard as specified in accordance with ETSI standard EN 302 755. In other examples embodiments of the present invention find application with the cable transmission standard known as DVB-C2. For the example of DVB-C2, it will be appreciated that the OFDM symbols are not transmitted and received via a radio frequency carrier, but via cable and so an appropriate adaptation of the transmitter and receiver architecture can be made. However, it will be appreciated that the present invention is not limited to application with DVB and may be extended to other standards for transmission or reception, both fixed and mobile.

The invention claimed is:

1. A receiver for recovering data from Orthogonal Frequency Division Multiplexed (OFDM) symbols, the OFDM symbols including a plurality of sub-carrier symbols, some of the sub-carrier symbols carrying data symbols and some of the sub-carrier signals carrying pilot symbols, the receiver comprising a demodulator arranged in operation to detect a signal representing the OFDM symbols, and to generate a sampled digital version of the OFDM symbols in the time domain, a Fourier transform processor arranged in operation to receive the time domain digital version of the OFDM symbols and to form a frequency domain version of the OFDM symbols, from which the pilot symbol sub-carriers and the data symbol bearing sub-carriers can be recovered, and a detector arranged in operation to recover the data symbols from the data bearing sub-carriers of the OFDM symbols, wherein the receiver includes a noise estimator arranged in operation to generate a long term estimate of noise power in the frequency domain version of the OFMD symbols at a plurality of frequencies, by accumulating an average noise power at the plurality of frequencies from a plurality of the OFDM symbols, and for generating an estimate of a current level of the noise power in the frequency domain version of a current one of the OFDM symbols at the plurality of frequencies, an impulsive noise detector arranged in operation to detect the presence of an impulse of noise in the current OFDM symbol, by comparing the noise power in the current OFDM symbol with the long term noise power at the plurality of frequencies, and to generate an impulse noise flag to indicate that the current OFDM symbol is affected by an impulse of noise if the comparison indicates the presence of an impulse of noise, and the detector is arranged to conceal the effect of the impulse noise on the recovering of the data symbols from the data bearing sub-carriers in response to the generated impulse noise flag, wherein the noise estimator is arranged to generate the long term estimate of noise power in the frequency domain version of the OFMD symbols at the plurality of frequencies, and the current estimate of the level of the noise power in the current OFDM symbol by comparing the pilot sub-carrier symbols with a regenerated version of the pilot sub-carrier symbols, which are known to the receiver.

2. A receiver as claimed in claim 1, wherein the detector includes a de-mapper which is arranged in operation to convert modulated data symbols received from the data bearing sub-carriers of the OFDM symbols into the data symbols, and a channel state estimator which is arranged to generate channel state information representative of a current state of a communications channel through which the OFDM symbols have passed, and to receive the impulse noise flag, and in response to the impulse noise flag being set to indicate that the current OFDM symbol has been affected by an impulse of noise, to adapt the channel state information in accordance with the current noise power level, and the de-mapper is operable to adapt the conversion of the modulated data symbols into data symbols in accordance with the current noise power, to the effect of concealing the effect of the impulse of noise.

3. A receiver as claimed in claim 1, wherein the noise estimator is arranged to receive the impulse noise detection flag, and in response to the impulse detection flag being set to indicate that the current OFDM symbol has been affected by an impulse of noise, to adapt the long term estimate of noise power in the frequency domain version of the OFMD symbols, by not including the current estimate of the noise power level for the current OFDM symbol in the estimate of the long term noise power.

4. A receiver as claimed in claim 1, wherein the pilot sub-carrier symbols are at least one of continuous pilot sub-carrier symbols or scattered sub-carrier symbols within the OFDM symbols.

5. A receiver as claimed in claim 1, wherein the pilot sub-carrier symbols include pilot sub-carriers symbols which are transmitted outside a frequency bandwidth occupied by the OFDM symbols.

6. A receiver as claimed in claim 1, wherein the impulsive noise detector is arranged in operation to detect the presence of an impulse of noise in the current OFDM symbol, by comparing the noise power in the current OFDM symbol with the long term noise power, and if the noise power level of the current OFDM symbol is greater than the long term average by a predetermined amount, determining that the impulse noise is present and representing the presence of the impulse noise using the impulse noise flag.

7. A receiver as claimed in claim 6, wherein the predetermined amount is a predetermined factor multiple of the long term noise power.

8. A method of recovering data from Orthogonal Frequency Division Multiplexed (OFDM) symbols, the OFDM symbols including a plurality of sub-carrier symbols, some of the sub-carrier symbols carrying data symbols and some of the sub-carrier signals carrying pilot symbols, the method comprising detecting a signal representing the OFDM symbols, generating a sampled digital version of the OFDM symbols in the time domain, forming a frequency domain version of the OFDM symbols from which the pilot symbol sub-carriers and the data bearing sub-carriers can be recovered by performing a Fourier transform on the time domain digital version of the OFDM symbols, and recovering the data symbols from the data bearing sub-carriers of the OFDM symbols, wherein the recovering the data symbols from the data bearing sub-carriers includes generating a long term estimate of noise power in the frequency domain version of the OFMD symbols at a plurality of frequencies, by accumulating an average noise power at the plurality of frequencies from a plurality of the OFDM symbols, generating an estimate of a current level of the noise power in the frequency domain version of a current one of the OFDM symbols at the plurality of frequencies, detecting the presence of an impulse of noise in the current OFDM symbol, by comparing the noise power in the current OFDM symbol with the long term noise power at the plurality of frequencies, generating an impulse noise flag to indicate that the current OFDM symbol is affected by an impulse of noise if the comparison indicates the presence of an impulse of noise, and concealing the effect of the impulse noise on the recovering of the data symbols from the data bearing sub-carriers in response to the generated impulse noise flag, wherein the generating the long term estimate of the noise power in the frequency domain version of the OFMD symbols at the plurality of frequencies, and the current estimate of the level of the noise power in the current OFDM symbol includes comparing the pilot sub-carrier symbols with a regenerated version of the pilot sub-carrier symbols, which are known to the receiver.

9. A method as claimed in claim 8, wherein the recovering the data symbols from the data bearing sub-carriers includes converting modulated data symbols received from the data bearing sub-carriers of the OFDM symbols into the data symbols from which the transmitted data can be recovered, and generating channel state information representative of a current state of a communications channel through which the OFDM symbols have passed, in response to the impulse noise flag being set to indicate that the current OFDM symbol has been affected by impulse noise, adapting the channel state information in accordance with the current noise power level, and adapting the conversion of the modulated data symbols into data symbols in accordance with the current noise power, to the effect of concealing the effect of the impulse of noise.

10. A method as claimed in claim 8, wherein the generating the long term estimate of the noise power includes in response to the impulse detection flag being set to indicate that the current OFDM symbol has been affected by an ,impulse of noise, adapting the long term estimate of noise power in the frequency domain version of the OFMD symbols, by not including the estimate of the noise power in the current OFDM symbol in the estimate of the long term noise power.

11. A method as claimed in claim 8, wherein the pilot sub-carrier symbols are at least one of continuous pilot sub-carrier symbols or scattered sub-carrier symbols within the OFDM symbols.

12. A method as claimed in claim 8, wherein the pilot sub-carrier symbols include pilot sub-carriers symbols which are transmitted outside a frequency bandwidth occupied by the OFDM symbols.

13. A receiver for recovering data from Orthogonal Frequency Division Multiplexed (OFDM) symbols, the OFDM symbols including a plurality of sub-carrier symbols, some of the sub-carrier symbols carrying data symbols and some of the sub-carrier signals carrying pilot symbols, the receiver comprising
  a demodulator arranged in operation to detect a signal representing the OFDM symbols, and to generate a sampled digital version of the OFDM symbols in the time domain,
  a Fourier transform processor arranged in operation to receive the time domain digital version of the OFDM symbols and to form a frequency domain version of the OFDM symbols, from which the pilot symbol sub-carriers and the data symbol bearing sub-carriers can be recovered, and
  a detector arranged in operation to recover the data symbols from the data bearing sub-carriers of the OFDM symbols, wherein the receiver includes
  a noise estimator arranged in operation to generate a long term estimate of noise power in the frequency domain version of the OFMD symbols at a plurality of frequencies, by accumulating an average noise power at the plurality of frequencies from a plurality of the OFDM symbols, and for generating an estimate of a current level of the noise power in the frequency domain version of a current one of the OFDM symbols at the plurality of frequencies,
  an impulsive noise detector arranged in operation to detect the presence of an impulse of noise in the current OFDM symbol, by comparing the noise power in the current OFDM symbol with the long term noise power at the plurality of frequencies, and to generate an impulse noise flag to indicate that the current OFDM symbol is affected by an impulse of noise if the comparison indicates the presence of an impulse of noise, and
  the detector is arranged to conceal the effect of the impulse noise on the recovering of the data symbols from the data bearing sub-carriers in response to the generated impulse noise flag,
  wherein the detector includes
  a de-mapper which is arranged in operation to convert modulated data symbols received from the data bearing sub-carriers of the OFDM symbols into the data symbols, and
  a channel state estimator which is arranged to generate channel state information representative of a current state of a communications channel through which the OFDM symbols have passed, and to receive the impulse noise flag, and in response to the impulse noise flag being set to indicate that the current OFDM symbol has been affected by an impulse of noise, to adapt the channel state information in accordance with the current noise power level, and the de-mapper is operable to adapt the conversion of the modulated data symbols into data symbols in accordance with the current noise power, to the effect of concealing the effect of the impulse of noise.

14. A receiver for recovering data from Orthogonal Frequency Division Multiplexed (OFDM) symbols, the OFDM symbols including a plurality of sub-carrier symbols, some of the sub-carrier symbols carrying data symbols and some of the sub-carrier signals carrying pilot symbols, the receiver comprising
  a demodulator arranged in operation to detect a signal representing the OFDM symbols, and to generate a sampled digital version of the OFDM symbols in the time domain,
  a Fourier transform processor arranged in operation to receive the time domain digital version of the OFDM symbols and to form a frequency domain version of the OFDM symbols, from which the pilot symbol sub-carriers and the data symbol bearing sub-carriers can be recovered, and
  a detector arranged in operation to recover the data symbols from the data bearing sub-carriers of the OFDM symbols, wherein the receiver includes
  a noise estimator arranged in operation to generate a long term estimate of noise power in the frequency domain version of the OFMD symbols at a plurality of frequencies, by accumulating an average noise power at the plurality of frequencies from a plurality of the OFDM symbols, and for generating an estimate of a current level of the noise power in the frequency domain version of a current one of the OFDM symbols at the plurality of frequencies,
  an impulsive noise detector arranged in operation to detect the presence of an impulse of noise in the current OFDM symbol, by comparing the noise power in the current OFDM symbol with the long term noise power at the plurality of frequencies, and to generate an impulse noise flag to indicate that the current OFDM symbol is affected by an impulse of noise if the comparison indicates the presence of an impulse of noise, and
  the detector is arranged to conceal the effect of the impulse noise on the recovering of the data symbols from the data bearing sub-carriers in response to the generated impulse noise flag,
  wherein the noise estimator is arranged to receive the impulse noise detection flag, and in response to the impulse detection flag being set to indicate that the current OFDM symbol has been affected by an impulse of noise, to adapt the long term estimate of noise power in the frequency domain version of the OFMD symbols, by not including the current estimate of the noise power level for the current OFDM symbol in the estimate of the long term noise power.

15. A method of recovering data from Orthogonal Frequency Division Multiplexed (OFDM) symbols, the OFDM symbols including a plurality of sub-carrier symbols, some of the sub-carrier symbols carrying data symbols and some of the sub-carrier signals carrying pilot symbols, the method comprising
  detecting a signal representing the OFDM symbols,
  generating a sampled digital version of the OFDM symbols in the time domain,
  forming a frequency domain version of the OFDM symbols from which the pilot symbol sub-carriers and the data bearing sub-carriers can be recovered by performing a Fourier transform on the time domain digital version of the OFDM symbols, and recovering the data symbols from the data bearing sub-carriers of the OFDM symbols, wherein the recovering the data symbols from the data bearing sub-carriers includes generating a long term estimate of noise power in the frequency domain version of the OFMD symbols at a plurality of frequencies, by accumulating an average noise power at the plurality of frequencies from a plurality of the OFDM symbols, generating an estimate of a current level of the noise power in the frequency domain version of a current one of the OFDM symbols at the plurality of frequencies, detecting the presence of an impulse of noise in the current OFDM symbol, by comparing the noise power in the current OFDM symbol with the long term noise power at the plurality of frequencies, generating an impulse noise flag to indicate that the current OFDM symbol is affected by an impulse of noise if the comparison indicates the presence of an impulse of noise, and concealing the effect of the impulse noise on the recovering of the data symbols from the data bearing sub-carriers in response to the generated impulse noise flag, wherein the recovering the data symbols from the data bearing sub-carriers includes converting modulated data symbols received from the data bearing sub-carriers of the OFDM symbols into the data symbols from which the transmitted data can be recovered, and generating channel state information representative of a current state of a communications channel through which the OFDM symbols have passed, in response to the impulse noise flag being set to indicate that the current OFDM symbol has been affected by impulse noise, adapting the channel state information in accordance with the current noise power level, and adapting the conversion of the modulated data symbols into data symbols in accordance with the current noise power, to the effect of concealing the effect of the impulse of noise.

16. A method of recovering data from Orthogonal Frequency Division Multiplexed (OFDM) symbols, the OFDM symbols including a plurality of sub-carrier symbols, some of the sub-carrier symbols carrying data symbols and some of the sub-carrier signals carrying pilot symbols, the method comprising detecting a signal representing the OFDM symbols, generating a sampled digital version of the OFDM symbols in the time domain, forming a frequency domain version of the OFDM symbols from which the pilot symbol sub-carriers and the data bearing sub-carriers can be recovered by performing a Fourier transform on the time domain digital version of the OFDM symbols, and recovering the data symbols from the data bearing sub-carriers of the OFDM symbols, wherein the recovering the data symbols from the data bearing sub-carriers includes generating a long term estimate of noise power in the frequency domain version of the OFMD symbols at a plurality of frequencies, by accumulating an average noise power at the plurality of frequencies from a plurality of the OFDM symbols, generating an estimate of a current level of the noise power in the frequency domain version of a current one of the OFDM symbols at the plurality of frequencies, detecting the presence of an impulse of noise in the current OFDM symbol, by comparing the noise power in the current OFDM symbol with the long term noise power at the plurality of frequencies, generating an impulse noise flag to indicate that the current OFDM symbol is affected by an impulse of noise if the comparison indicates the presence of an impulse of noise, and concealing the effect of the impulse noise on the recovering of the data symbols from the data bearing sub-carriers in response to the generated impulse noise flag, wherein the generating the long term estimate of the noise power includes in response to the impulse detection flag being set to indicate that the current OFDM symbol has been affected by an impulse of noise, adapting the long term estimate of noise power in the frequency domain version of the OFMD symbols, by not including the estimate of the noise power in the current OFDM symbol in the estimate of the long term noise power.

* * * * *